United States Patent

[11] 3,561,623

[72] Inventor Edward W. McCaul
Bloomfield Hills, Mich.
[21] Appl. No. 789,490
[22] Filed Jan. 7, 1969
[45] Patented Feb. 9, 1971
[73] Assignee Jervis B. Webb Company
a corporation of Michigan

[54] ARTICLE-HANDLING SYSTEM FOR BAGGAGE OR OTHER CARGO
20 Claims, 5 Drawing Figs.

[52] U.S. Cl. .................................................. 214/11,
214/16, 214/38
[51] Int. Cl. ........................................................ B65g 43/00
[50] Field of Search............................................ 214/16.4,
16B, 11, 38.8; 198/38

[56] References Cited
UNITED STATES PATENTS
1,577,184 3/1926 Fitch ........................... 214/38
3,260,349 7/1966 Vander Meer .............. 198/38

Primary Examiner—Gerald M. Forlenza
Assistant Examiner—Raymond B. Johnson
Attorney—Farley, Forster and Farley ABSTRACT: A system for handling baggage or other cargo of a vehicle such as an aircraft equipped with cargo containers. Each container is provided with a number of removable cargo trays. A terminal includes a vehicle loading and unloading dock, conveyorized for moving containers, and having a container storage area and a station where trays are unloaded from or loaded into containers. A tray conveyor extends between the container loading and unloading station and a tray transfer station. Carriers of a tray transporting conveyor selectively operate between the transfer station, where trays are automatically transferred to or from the carriers, and tray loading and unloading stations in the terminal. Operation of the system in an unloading direction results in loaded trays being delivered by the carriers to selected unloading loops at a delivery area where carriers circulate until unloaded. In the loading operation of the system, loaded trays are transported by the carriers, transferred to the tray conveyor and forwarded to the container loading station.

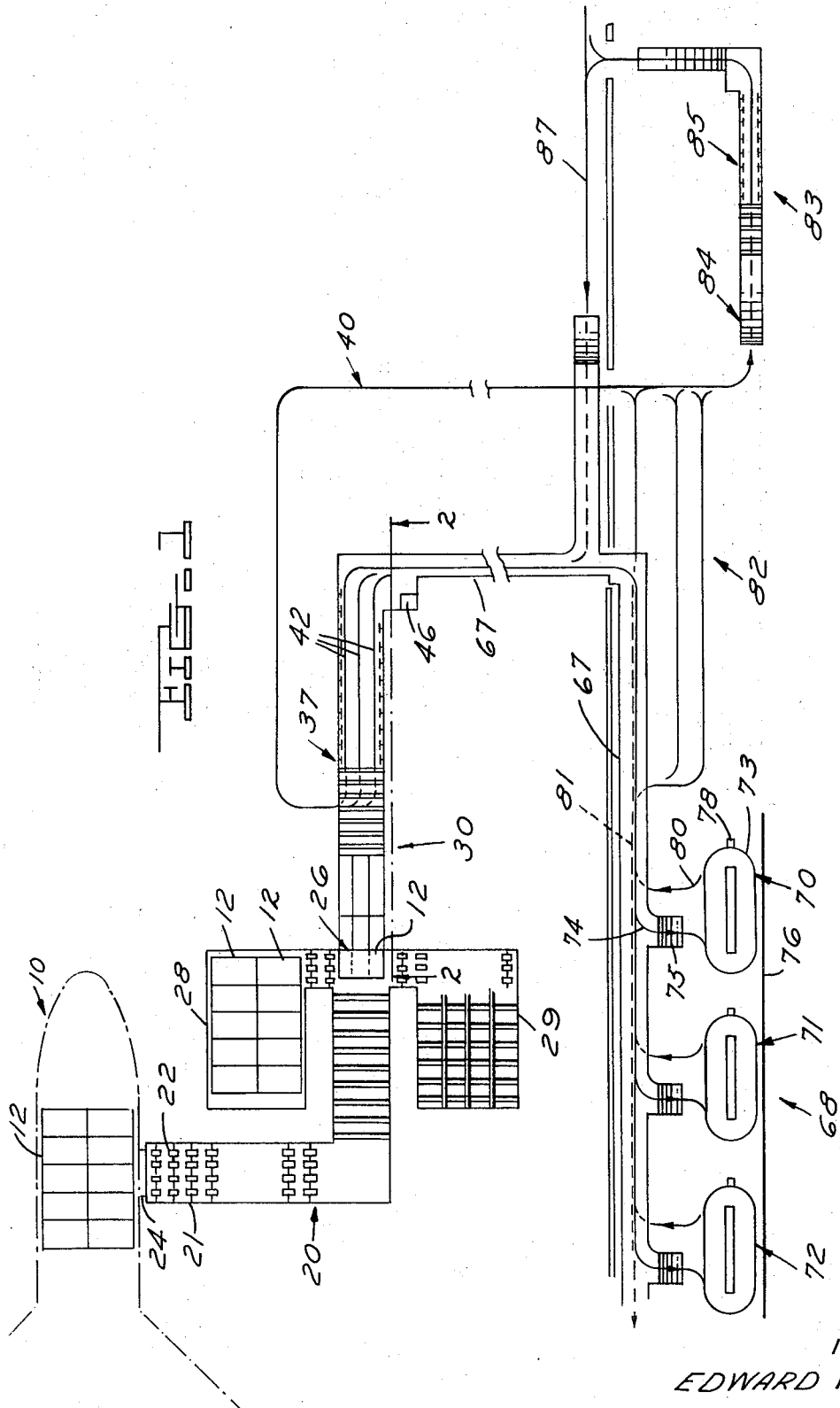

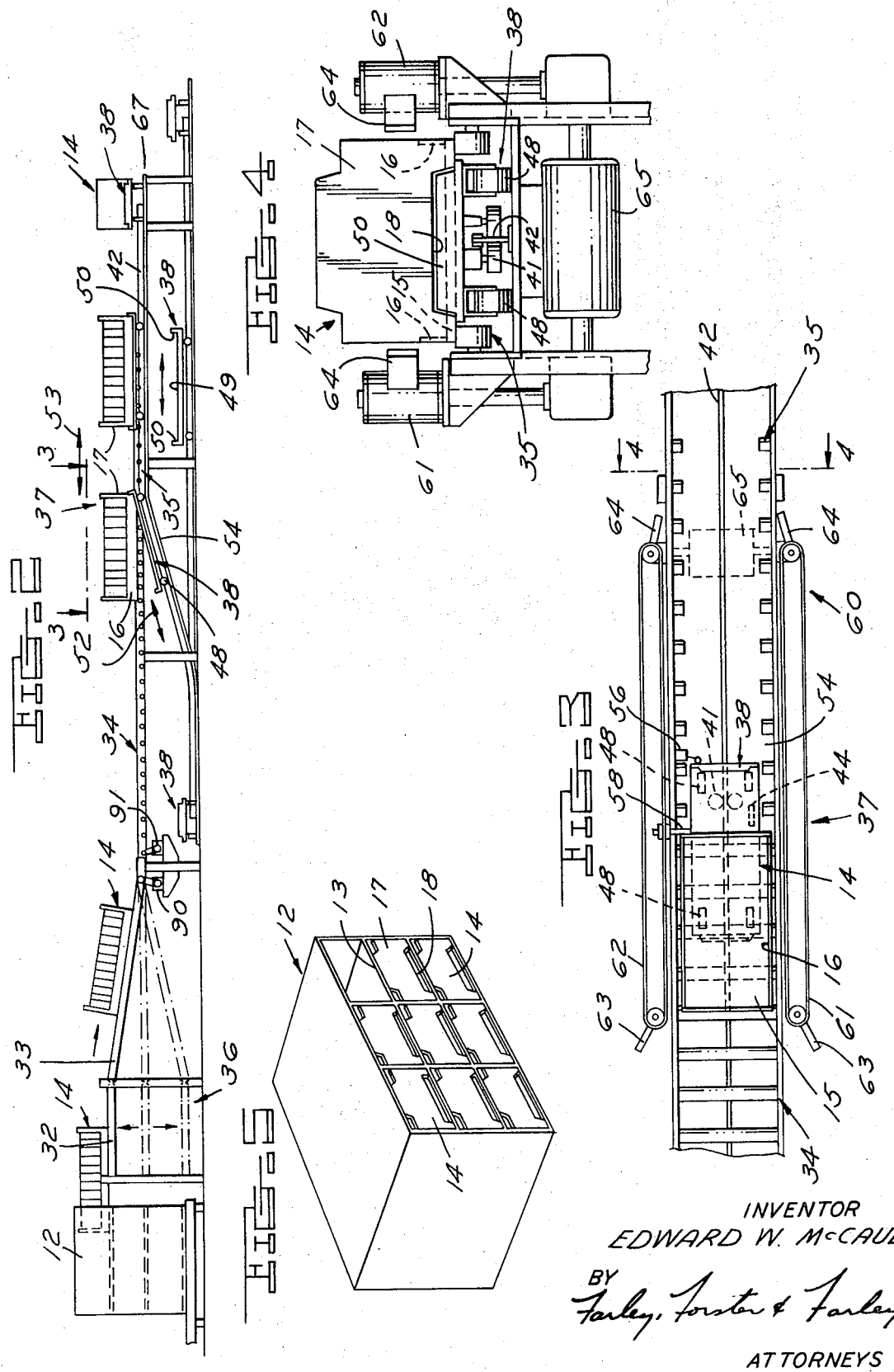

ARTICLE-HANDLING SYSTEM FOR BAGGAGE OR OTHER CARGO

BACKGROUND OF THE INVENTION

1. Field of the Invention

This invention relates to a material handling system for rapid loading and unloading of a cargo-carrying vehicle and is particularly adapted to the handling of baggage at an air terminal.

2. Description of the Prior Art

Methods presently employed for handling baggage at a terminal employ tractor-drawn carts shuttling between the vehicle and baggage receiving receiving and delivery areas in the terminal and require several manual loading and unloading operations involving the handling of each article. Instances of delay, loss, damage and misrouting multiply with the increasing size of aircraft and number of passengers as do the costs of baggage handling to carriers. The newer and larger aircraft are being equipped with baggage and cargo containers, but the use of these containers has not reduced the manual handling, particularly of baggage.

The object of the present invention is to provide an article handling system for cargo such as baggage which is operable with a minimum amount of manpower and with a minimum manual handling of each article in the transfer of baggage between receiving and delivery areas in the terminal and the vehicle. A further object is to provide improved sorting of baggage and distribution thereof at the baggage delivery area to expedite the receipt of baggage by passengers.

SUMMARY OF THE INVENTION

The article handling system of the invention is particularly adapted for use with a transport vehicle such as an aircraft having one or more baggage or cargo containers. The system provides a plurality of cargo trays adapted to be removably carried in each container. A vehicle service dock at the terminal is conveyorized for the handling of containers to and from the vehicle and a container and tray transfer station. A plurality of propellable tray carriers each having a bed adapted to engage and support a tray are operable on a track network or other guiding means between a delivery station in the terminal and a tray and carrier transfer station adjacent the dock, this transfer station being served by try tray conveyor means extending to the container and tray transfer station of the dock. The tray and carrier transfer station includes means for automatically transferring a tray between the tray conveyor means and a carrier.

In the unloading of baggage from the vehicle, containers are moved out of the vehicle to the container and tray transfer station on the dock where trays are unloaded from the containers onto the tray conveyor means and conveyed thereby to the tray and carrier transfer station. Here a tray is automatically picked up by an empty carrier which is dispatched over the carrier guiding means to the baggage delivery area in the terminal. Preferably the baggage delivery area includes a plurality of guide paths or loops around which carriers can circulate past an unloading zone where passengers can remove their baggage from the trays. A sensing device on each loop indicates when a tray on a carrier is unloaded and controls the operation of switch means for diverting the carrier from the loop in response to such an unloaded condition.

The system can be extended to include a carrier storage area and a loading station where empty carriers can pick up trays loaded with baggage for delivery to a vehicle at the dock. For vehicle loading, the operation of the system is reversed, and carriers with trays loaded with baggage are dispatched to the tray and carrier transfer station where the trays are automatically removed from the carriers onto the conveyor means, conveyed to the tray and container transfer station of the dock and loaded into containers.

Other features and advantages of the invention will become apparent from the following description of the representative embodiment disclosed in the accompanying drawings.

DESCRIPTION OF THE DRAWINGS

FIG. 1 is a schematic plan view of an air terminal equipped with the baggage handling system of the invention;

FIG. 2 is an elevation, taken as indicated by the line 2—2 of FIG. 1;

FIG. 3 is an enlarged plan view of a carrier and tray transfer station, taken as indicated by the arrows 3—3 of FIG. 2;

FIG. 4 is an elevation taken on the line 4—4 of FIG. 3; and

FIG. 5 is a perspective view of a container.

DESCRIPTION OF THE PREFERRED EMBODIMENT

The handling system to be described is intended as representative only of the invention, as each installation of the system will depend upon factors encountered at a particular terminal facility and must be designed accordingly. This representative system illustrates the application of the invention to the handling of baggage at an air terminal to and from an aircraft 10, indicated in FIG. 1 equipped with a set of 10 baggage containers 12. These containers are designed by the aircraft manufacturer and are furnished with an aircraft of a particular type, and present containers are merely large boxes into which baggage must be loaded manually, with a similar unloading operation at each destination.

According to the invention, and as illustrated in FIG. 5, each of the containers 12 is equipped with a number of tiers 13 of removable baggage trays 14 which are identical in construction. Each tray includes a bottom 15, sides 16 and end panels 17, each provided with a recess 18. A representative tray construction may be 5 feet in length and 2½ feet in width.

Referring to FIG. 1, a service facility or dock 20 is provided for handling the containers 12 of the aircraft 10. This dock 20 may be constructed as an intermediate level or mezzanine of a passenger service facility, since on the newer aircraft passenger access thereto is at a higher level than the baggage and freight access doors. Portion 21 of the dock may be made movable relative to the aircraft 10. The surface of the dock is conveyorized as indicated at 22, by conventional powered roller conveyors, wheel conveyors, air conveyors, or any desired combination thereof to facilitate the handling of containers 12 between a container and vehicle transfer station 24, a container and tray transfer station 26, and container storage areas 28 and 29.

A container 12 is shown in FIGS. 1 and 2 at the transfer station where trays 14 are manually transferred to or from the container and a tray conveying means 30 which consists of the combination of conventional belt conveyors 32 and 33, accumulation-type roller conveyors 34 and skate-wheel conveyors 35, preferably installed in multiple paths corresponding to the number of trays 14 in a container tier 13. Elevator means 36 (FIG. 2), consisting of a suitable lift supporting the belt conveyors 32 and one end of the belt conveyors 33 are provided at the transfer station to facilitate the transfer of trays 14 from the tiers 13 of the container 12.

The tray conveying means 30 extends between the transfer station 26 and a carrier and tray transfer station 37, best shown in FIGS. 2 and 3, provided with means for automatically transferring trays 14 to and from carriers 38.

Carriers 38 are of a propellable type capable of following a guide means or track 40. The particular carriers 38 shown incorporate a motorized pinch-roll type of drive 41 engaging a single rail member 42 mounted on edge, as illustrated in FIGS. 3 and 4. Each carrier 38 may be driven along the rail 42 as a function of the power supplied to the pinch-roll drive 41 by conductors carried by the rail. Switches are installed at rail junction points and each carrier is equipped with a dispatch-signal-carrying member 44 (FIG. 3) which may be magnetically coded by a dispatcher at a dispatch station 46 (FIG. 1) to selectively control switch operation in a known manner.

Each carrier 38 has supporting wheels 48 and a bed 49 adapted to engage and support a tray 14, the width or transverse dimension of the bed 49 being less than the width or transverse dimension of a tray 14, as shown in FIG. 4; and, vertical flanges 50 at the ends of the carrier bed 49, together with the recesses 18 in the ends 17 of the trays provide interengageable means for locating a tray 14 on the bed 49 of a carrier with the sides of the tray extending outwardly of the sides of the bed, as shown in FIGS. 2—4.

At the tray and carrier transfer station 37, (FIG. 3) the skate wheel conveyors 35 are spaced apart transversely a distance greater than the width of the carrier bed 49, but less than the width of the tray 14, and the rail member 42 at the station positions the bed 49 of the carrier between the conveyors 35.

An empty carrier 38 proceeding through the transfer station 37 in an aircraft unloading operation, moves from left to right as indicated by the arrow 52, FIG. 2, and proceeds up an inclined support 54 until movement of the carrier is arrested by a retractable stop 56, FIG. 3. A loaded tray 14 enters the transfer station 37 as indicated by the arrow 53 and proceeds along the conveyors 34, 35 until halted by a retractable stop 58. The stops 56, 58 relatively position a loaded tray and empty carrier with the carrier located in advance of the tray and extending from an elevation below the tray to an elevation at which the flange 50 on the front of the carrier is engageable by the leading end of a tray. Conventional sensing devices associated with the stops 56 and 58 control the operation of indexing means 60, shown in FIG. 3, and consisting of a pair of endless chains 61 and 62 each equipped with a pair of pushers 63 and 64 and operable by a common drive unit 65. FIG. 3 illustrates a carrier engaging the stop 56 and a tray 14 engaging the stop 58, a condition which results in operation of the drive 65 to the chains 61 and 62. Ensuing movement of the chains 61 and 62 and withdrawal of the stops 56 ad and 58 places the pushers 63 of the chains in engagement with the rear of the tray, advances the tray into engagement with the front flange 50 of the carrier 38 and then advances the tray and carrier to a position in which the carrier bed is above the level of the conveyors 35 and the tray is supported on and interlocked with the carrier. Operation of the indexing drive 65 is stopped when the chain pushers 64 reach the position shown for the pushers 63. This transfer results from the fact that the carrier support 54 and tray conveyors 35 extend through the transfer station 37 in vertically changing relation between an elevation at which the bed 49 of a carrier is above the tray conveyors 35 and an elevation at which the carrier 38 is below the tray conveyors 35.

Loaded carriers coming from the transfer station 37 are coded by a dispatcher at the dispatch station 46 and travel along the elevated guide track 67 to a baggage delivery station 68 in the terminal. A preferred feature of the system is the use of an identification check given to the passenger, preferably coded by color. The delivery station 68 includes a plurality of loops, 70, 71, and 72, each loop being defined by a carrier rail member 73 and being connected to the main elevated path of carrier travel 67 by a switch 74 and a carrier ramp 75 (as required). Carriers containing baggage of one code are dispatched to loop 70, baggage of another code to loop 71 and so on, and once a carrier enters its designated loop, it circulates past waiting passengers at a delivery counter 76 until the tray 14 on the carrier is unloaded.

This unloaded condition of the tray may be detected by a suitable sensing device such as a load-responsive switch 78 installed in each loop and which controls the operation of a loop exit switch 80 to divert an unloaded carrier to a return line 81 which may lead to multiple lines of a carrier and tray storage station 82 and to a baggage-receiving and carrier-loading station 83.

At the loading station 83, baggage checked in by departing passengers may be placed directly in a tray on a carrier, or alternately may be placed in a tray on a separate conveying device 84 for delivery to a tray and carrier transfer station 85 similar to the station 37 previously described. In either event loaded carriers are dispatched along the line 87 for return to the transfer station 37 and travel therethrough in the opposite or aircraft-loading direction, and as carriers pass through the station and follow the downwardly inclined support 54 a tray is automatically transferred from the carrier to the tray conveyors 35. Tray conveyors 34 and 32, 33 are each driven by reversible driving units 90 and 91 (FIG. 2) and operate to deliver trays from the transfer station 37 to the container and tray transfer station 26 where the trays are loaded into a container 12.

The carriers 38 are preferably capable of being propelled at relatively high speeds, on the order of 15 miles per hour, to satisfy the requirement for rapid delivery of baggage over the relatively long distances encountered in air terminals. The track system for the carriers 38 may be expanded to include suitable connecting lines between one aircraft service area and another, for routing and delivery of interchange and connecting flight baggage.

The system is particularly suited to the handling of baggage for the larger aircraft soon to enter service which will necessitate the handling of over 500 pieces of baggage on a single flight. When the present system is used completely for loading and unloading, each individual piece of baggage merely has to be placed in a tray 14 when checked in and removed therefrom by the passenger at the destination. The delivery of large amounts of baggage is expedited due to the facility with which the delivery area can be expanded and broken down into coded readily identifiable areas.

At the service dock 20, the provision of at least two container storage areas 28 and 29 permits the use of multiple sets of containers, one of which can be loaded in advance of the arrival of a flight, at least to a considerable extent.

In the application of the system of the invention to an existing terminal facility, limitations imposed by the physical layout thereof may make it impractical to employ the invention to the extent illustrated in FIG. 1. For example, it may not be feasible to install tracks so that the carriers 38 may directly serve existing baggage check-in counters, but existing equipment may be used to deliver baggage to a suitable area where carriers and trays can be loaded.

Those skilled in the art will readily recognize the flexibility of the system and the extent to which it can be incorporated in existing terminals, expanded as conditions permit, and designed for complete system application to terminals of the future.

I claim:

1. An article handling system for cargo such as baggage of a transport vehicle having one or more cargo containers, comprising:

a plurality of cargo trays adapted to be removably carried in each container;

a dock having a container and vehicle transfer station and a container and tray transfer station;

a plurality of propellable tray carriers each having a bed adapted to engage and support a tray;

tray conveyor means arranged between the container and tray transfer station and a tray and carrier transfer station;

means at the tray and carrier transfer station for automatically transferring a tray between the tray conveyor means and a carrier; and means for guiding the carriers between the tray and carrier transfer station and a cargo delivery station.

2. An article-handling system according to claim 1 wherein the means for guiding the carriers includes a plurality of guide paths at the cargo delivery station to which carriers can be selectively dispatched.

3. And An article-handling system according to claim 2 wherein each of the guide paths at the delivery station comprises a loop around which a carrier can circulate.

4. An article-handling system according to claim 3 wherein each loop includes means for sensing the unloaded condition of a tray on a carrier, and switch means for diverting a carrier from the loop in response to such unloaded condition.

5. An article-handling system according to claim 1 wherein the means for guiding an the carriers extends to a carrier storage station.

6. An article-handling system according to claim 1 wherein the means for guiding the carriers extends to a carrier loading station.

7. An article-handling system according to claim 6 wherein the carrier loading station includes means for automatically transferring a tray to a carrier.

8. An article-handling system according to claim 1 wherein each container is constructed to carry trays in tiers.

9. An article-handling system according to claim 8 including elevator means at the container and tray transfer station whereby the tray conveyor means is capable of handling trays at the level of each tier of a container.

10. An article-handling system according to claim 9 wherein the tray conveyor means is supported by the elevator means.

11. An article-handling system according to claim 1 wherein the dock includes two container storage areas and is conveyorized for the movement of containers between said storage areas, the container and vehicle transfer station and the container and tray transfer station.

12. An article-handling system according to claim 1 wherein the means for guiding the carriers comprises a monorail track system.

13. An article-handling system according to claim 12 wherein each tray carrier is motorized.

14. An article-handling system according to claim 1 wherein each tray has a transverse dimension greater than the transverse dimension of the bed of a carrier, and interengageable means on the tray and carrier for locating a tray on the bed with the sides of the tray extending outwardly of the sides of the bed.

15. An article-handling system according to claim 14 wherein the tray conveyor means at the tray and carrier transfer station includes tray-conveying devices spaced apart transversely a distance greater than the transverse dimension of the carrier bed but less than the transverse dimension of the tray, a carrier support, the carrier support and tray-conveying devices extending through the station in vertically changing relation between an elevation at which the bed of a carrier is above the tray-conveying devices and an elevation at which the carrier is below the tray-conveying devices, and the means for guiding the carriers extends through the tray and carrier transfer station to position the bed of the carrier between the tray-conveying devices.

16. An article-handling system according to claim 15 wherein the direction of movement of a carrier and of the tray-conveying devices at the tray and carrier transfer station is reversible whereby movement in one direction transfers a tray from the tray-conveying devices to the bed of a carrier and movement in the other direction transfers a tray from the bed of a carrier to the tray-conveying devices.

17. An article-handling system according to claim 15 wherein the means at the tray and carrier transfer station for automatically transferring a tray between the tray-conveyor means and a carrier includes means for relatively positioning a tray and empty carrier with the carrier located in advance of the tray and extending from an elevation below the tray to an elevation at which a portion of the carrier is engageable by the leading end of a tray, and indexing means operable in response to the presence of a properly positioned tray and carrier to advance a tray into engagement with a carrier and advance the tray and carrier to a position at which the elevation of the bed of a carrier is above the tray-conveying devices and the tray is supported on the carrier bed.

18. An article-handling system according to claim 17 wherein the indexing means comprises a pair of chains each having a tray pusher mounted thereon, means mounting the chains on either side of the path of travel of a tray over the conveying devices, and means for driving the chains.

19. An article-handling system according to claim 1 wherein the tray conveyor means includes a reversible driving device and is operable in one direction to receive trays from a container at the container and tray transfer station, and is operable in the opposite direction to delivery trays to the container and tray transfer station.

20. An article-handling system according to claim 19 wherein the direction of movement of a carrier through the tray and carrier transfer station is reversible, the means at the tray and transfer station for automatically transferring a tray between the tray conveyor means and a carrier being responsive to the direction of carrier movement whereby carrier movement in one direction results in the transfer of a tray from the tray conveyor means to a carrier and movement in the opposite direction results in transfer of a tray from a carrier to the tray-conveyor means.